US012126235B2

(12) United States Patent
Hattori et al.

(10) Patent No.: US 12,126,235 B2
(45) Date of Patent: Oct. 22, 2024

(54) MOTOR

(71) Applicant: Nidec Corporation, Kyoto (JP)

(72) Inventors: Takashi Hattori, Kyoto (JP); Yu Kuwamoto, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 217 days.

(21) Appl. No.: 17/913,215

(22) PCT Filed: Mar. 9, 2021

(86) PCT No.: PCT/JP2021/009383
§ 371 (c)(1),
(2) Date: Sep. 21, 2022

(87) PCT Pub. No.: WO2021/193040
PCT Pub. Date: Sep. 30, 2021

(65) Prior Publication Data
US 2023/0126488 A1 Apr. 27, 2023

(30) Foreign Application Priority Data
Mar. 25, 2020 (JP) ................. 2020-054903

(51) Int. Cl.
H02K 3/52 (2006.01)
H02K 5/173 (2006.01)
(Continued)

(52) U.S. Cl.
CPC .......... H02K 3/522 (2013.01); H02K 5/1732 (2013.01); H02K 5/225 (2013.01); H02K 7/083 (2013.01); H02K 2203/06 (2013.01)

(58) Field of Classification Search
CPC ...... H02K 3/522; H02K 5/225; H02K 5/1732; H02K 7/083; H02K 2203/06
See application file for complete search history.

(56) References Cited

U.S. PATENT DOCUMENTS 8,692,424 B2   4/2014 Bohrer et al.
8,888,541 B2   11/2014 Endo et al.
(Continued)

FOREIGN PATENT DOCUMENTS

EP   3 404 805 A1   11/2018
JP   62-91556 U   6/1987
(Continued)

OTHER PUBLICATIONS

Official Communication issued in International Patent Application No. PCT/JP2021/009382, mailed on May 11, 2021.
(Continued)

Primary Examiner — Jue Zhang
(74) Attorney, Agent, or Firm — Keating & Bennett, LLP

(57) ABSTRACT

A motor includes a rotor that includes a shaft located along a central axis, a stator that includes coils and opposes the rotor in a radial direction, and a lead wire support portion that is above the coil and supports lead wires extending from the coils. The lead wire support portion includes a guide portion through which the lead wires extend and which guides the lead wires to an upper side of the lead wire support portion in an axial direction. The guide portion includes a tubular insertion portion which opposes the coil and into which the lead wires are inserted and a tubular lead portion which is above the insertion portion and from which the lead wires inserted from the insertion portion are drawn out.

18 Claims, 12 Drawing Sheets

(51) Int. Cl.
    *H02K 5/22*    (2006.01)
    *H02K 7/08*    (2006.01)

(56) References Cited

U.S. PATENT DOCUMENTS

| | | |
|---|---|---|
| 8,968,010 B2 | 3/2015 | Endo et al. |
| 9,119,324 B2 | 8/2015 | Kifer et al. |
| 9,214,760 B2 | 12/2015 | Endo et al. |
| 9,300,059 B2 | 3/2016 | Endo et al. |
| 9,509,072 B2 | 11/2016 | Endo et al. |
| 9,673,574 B2 | 6/2017 | Endo et al. |
| 10,063,120 B2 | 8/2018 | Kawamoto et al. |
| 10,554,093 B2 | 2/2020 | Miwa et al. |
| 10,680,482 B2 | 6/2020 | Okamoto et al. |
| 10,903,711 B2 | 1/2021 | Ogawa et al. |
| 2001/0054853 A1* | 12/2001 | Hayashi ............... H02K 5/225 310/71 |
| 2003/0042813 A1* | 3/2003 | Morikaku ............ H02K 11/215 310/91 |
| 2011/0193433 A1 | 8/2011 | Bohrer et al. |
| 2012/0286604 A1* | 11/2012 | Abe ..................... H02K 11/33 310/71 |
| 2012/0319511 A1 | 12/2012 | Kifer et al. |
| 2014/0152130 A1* | 6/2014 | Shimano ............... H02K 5/225 310/71 |
| 2014/0357134 A1 | 12/2014 | Endo et al. |
| 2018/0233984 A1 | 8/2018 | Ogawa et al. |

FOREIGN PATENT DOCUMENTS

| | | |
|---|---|---|
| JP | 5692346 B1 | 4/2015 |
| JP | 5862700 B2 | 2/2016 |
| JP | 5979279 B2 | 8/2016 |
| JP | 2016-178845 A | 10/2016 |
| JP | 2017-060235 A | 3/2017 |
| JP | 2017-127146 A | 7/2017 |
| JP | 6155820 B2 | 7/2017 |
| JP | 6399144 B2 | 10/2018 |
| JP | 2019-068506 A | 4/2019 |
| JP | 2019-180198 A | 10/2019 |
| WO | 2018/180639 A1 | 10/2018 |
| WO | 2018/212123 A1 | 11/2018 |

OTHER PUBLICATIONS

Official Communication issued in International Patent Application No. PCT/JP2021/009383, mailed on Apr. 13, 2021.
Hattori et al., "Motor", U.S. Appl. No. 17/913,214, filed Sep. 21, 2022.

* cited by examiner

MOTOR

CROSS REFERENCE TO RELATED APPLICATION

This is a U.S. national stage of application No. PCT/JP2021/009383, filed on Mar. 9, 2021, and with priority under 35 U.S.C. § 119 (a) and 35 U.S.C. § 365 (b) being claimed from Japanese Application No. 2020-054903, filed on Mar. 25, 2020, the entire contents of which are hereby incorporated herein by reference.

1. FIELD OF THE DISCLOSURE

The present disclosure relates to a motor.

2. BACKGROUND

Conventionally, a lead wire (an end portion of a conductive wire of a coil) extending from the coil of a motor is supported on one axial side of a motor shaft. For example, there is known a motor having a configuration including a guide portion that guides a lead wire toward one axial side of the motor. The guide portion is formed in a tubular shape, and allows passage of the lead wire in the axial direction (see, for example, US 2012/319511 A).

When the lead wire and another connection target member are electrically connected near the guide portion having the above configuration, the lead wire sometimes needs to be deformed and displaced. At this time, there is a possibility that a tubular part of the guide portion interferes with the electrical connection. However, the tubular part of the guide portion is necessary to insulate the lead wire from the surroundings, and there is a problem in achieving both workability at the time of connecting the lead wire and an insulating property of the lead wire.

SUMMARY

Example embodiments of the present disclosure provide motors each capable of achieving both an insulating property of a lead wire and workability at the time of connecting the lead wire.

A motor according to an example embodiment of the present disclosure includes a rotor that includes a shaft located along a central axis extending in a vertical direction, a stator that includes coils and opposes the rotor in a radial direction, and a lead wire support portion that is above the coil and supports lead wires extending from the coils. The lead wire support portion includes a guide portion through which the lead wire passes and which guides the lead wires to an upper side of the lead wire support portion in an axial direction. The guide portion includes a tubular insertion portion which opposes the coils and into which the lead wire is inserted, and a tubular lead portion which is above the insertion portion and from which the lead wire inserted from the insertion portion is drawn out. The lead portion includes a cylindrical circumferential wall extending in the vertical direction, and includes a notch in which a portion of the circumferential wall in a circumferential direction is opened in the radial direction.

The above and other elements, features, steps, characteristics and advantages of the present disclosure will become more apparent from the following detailed description of the example embodiments with reference to the attached drawings.

DETAILED DESCRIPTION

Hereinafter, motors according to example embodiments of the present disclosure will be described with reference to the accompanying drawings. Note that the scope of the present disclosure is not limited to the example embodiments described below, and any modification can be made within the scope of the technical ideas of the present disclosure.

Figure 2:
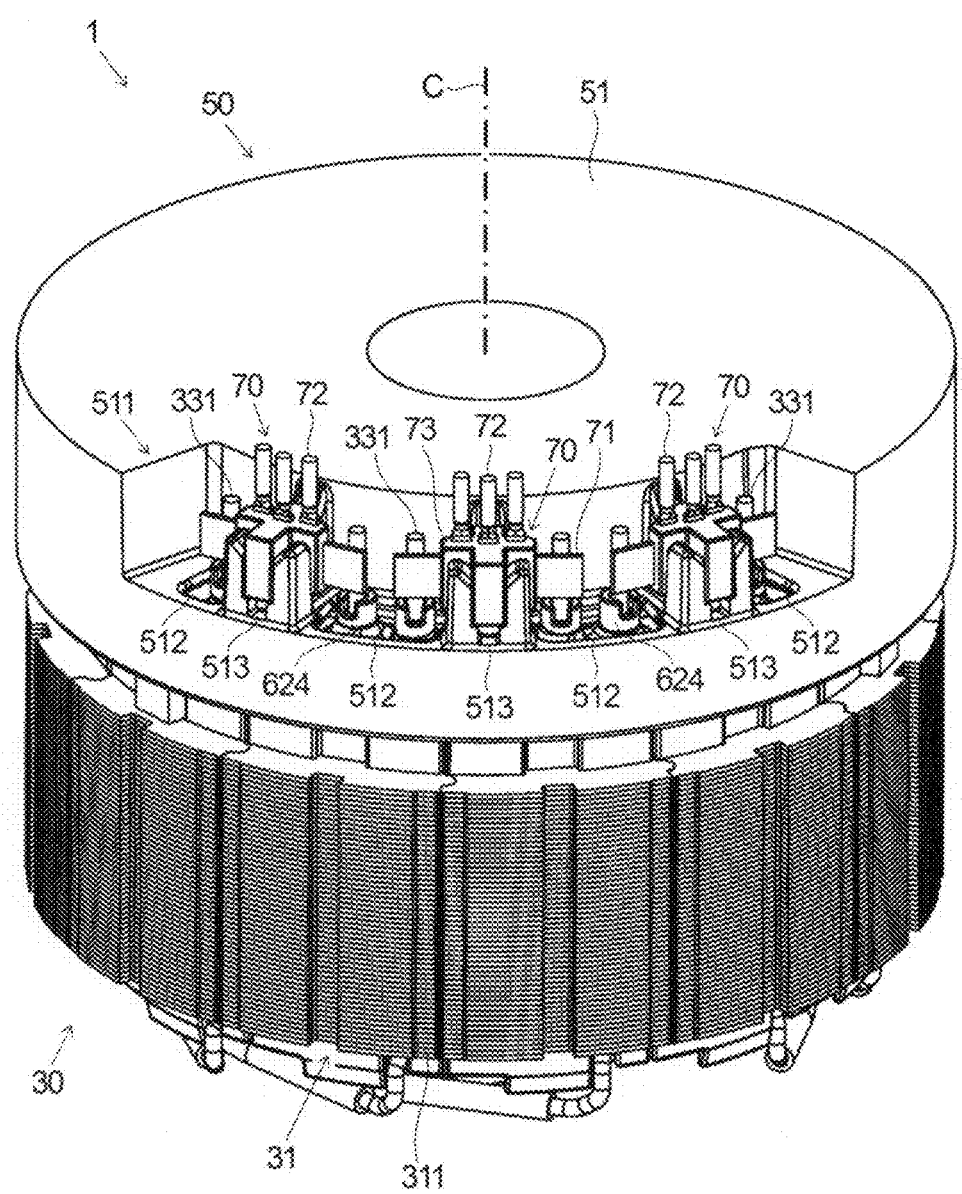
FIG. 2 is a perspective view of the motor.

It is assumed herein that: a direction parallel to a central axis of the motor is referred to simply by the term "axial direction", "axial", or "axially"; a direction perpendicular to the central axis of the motor is referred to simply by the term "radial direction", "radial", or "radially"; and a direction along a circle around the central axis of the motor is referred to simply by the term "circumferential direction", "circumferential", or "circumferentially". Further, the central axis of the motor is assumed to extend in a vertical direction in the present specification for the sake of convenience in description. Therefore, a shape and a positional relationship of each portion will be described assuming that the axial direction is the "vertical direction" and the vertical direction in FIG. 2 is the vertical direction of the motor. Note that the above definition of the vertical direction does not restrict the orientations and positional relations of the motor when in use.

Further, in this specification, a section parallel to the axial direction is referred to as a "longitudinal section". Further, the terms "parallel" and "perpendicular" used in the present specification include not only those "exactly parallel" and "exactly perpendicular", respectively, but also those "substantially parallel" and "substantially perpendicular", respectively.

Figure 1:
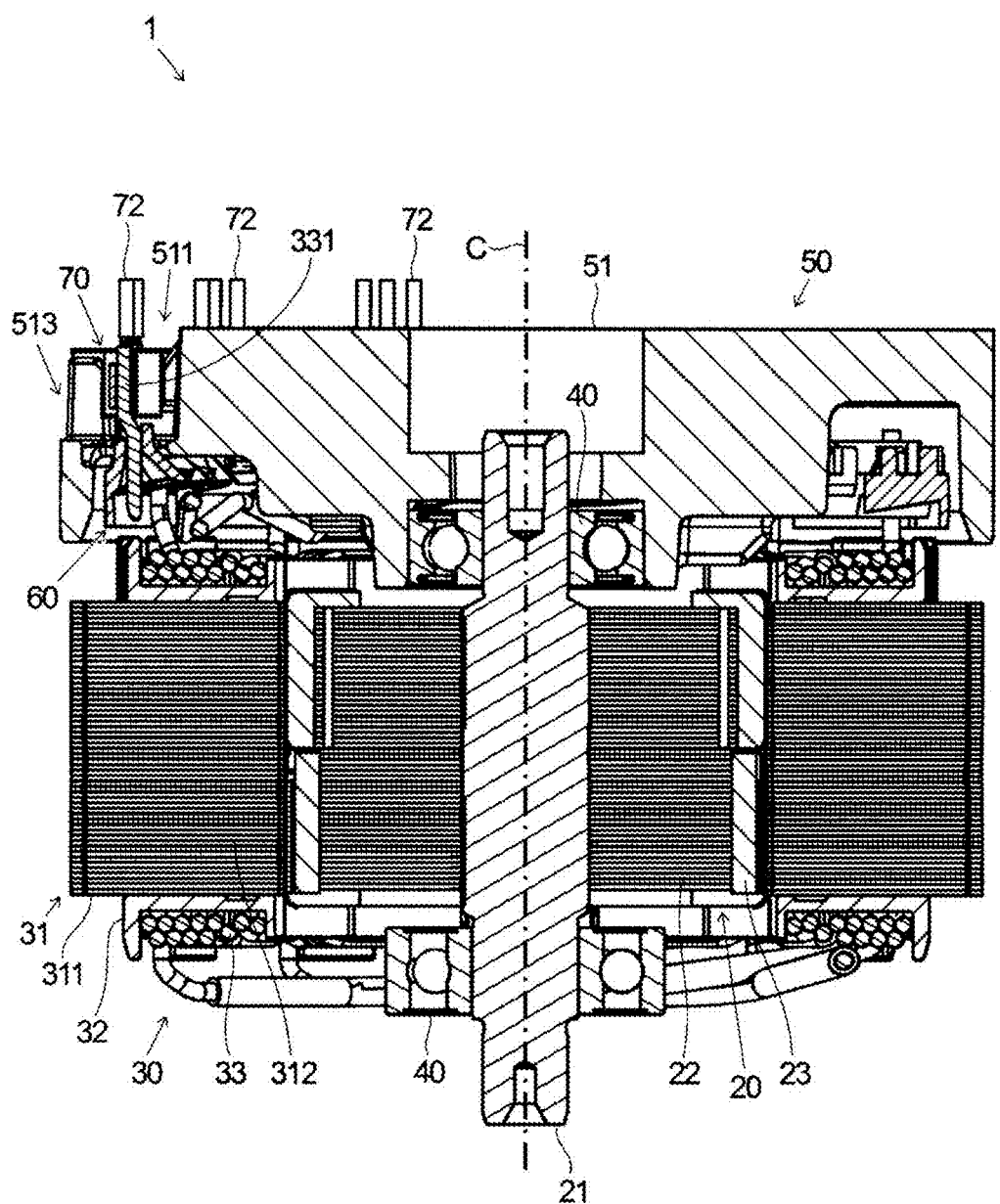
FIG. 1 is a longitudinal sectional view of a motor of an example embodiment of the present disclosure.
Figure 3:
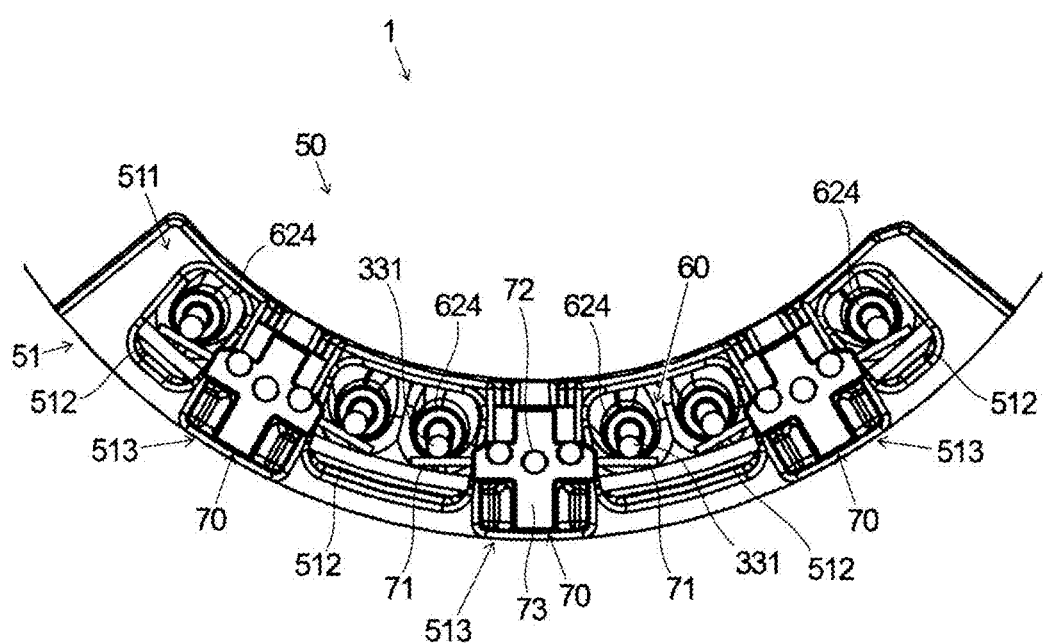
FIG. 3 is a partially enlarged plan view of the motor.

FIG. 1 is a longitudinal sectional view of a motor 1 of the example embodiment. FIG. 2 is a perspective view of the motor 1. FIG. 3 is a partially enlarged plan view of the motor 1. The motor 1 includes a rotor 20, a stator 30, bearings 40, a casing 50, a lead wire support portion 60, and terminals 70.

The rotor 20 is disposed radially inward of the stator 30. The rotor 20 includes a shaft 21 disposed along a central axis C extending in the vertical direction. The shaft 21 is a columnar member that is made of, for example, metal and extends in the vertical direction.

The rotor 20 further includes a rotor core 22 and a magnet 23. The rotor core 22 has a cylindrical shape extending in the vertical direction, and is fixed to a radially outer circumferential portion of the shaft 21 inserted radially inward. The rotor core 22 is formed by, for example, layering a plurality of electromagnetic steel plates in the vertical direction.

The magnet 23 is fixed to a radially outer circumferential portion of the rotor core 22. The magnet 23 has, for example, a cylindrical shape extending in the vertical direction and is fixed to the radially outer circumferential portion of the rotor core 22. A radially outer circumferential surface of the magnet 23 faces a radially inner circumferential surface of the stator 30 in the radial direction. The magnet 23 has S poles and N poles alternately arranged in the circumferential direction.

The stator 30 is disposed radially outward of the rotor 20. The stator 30 is disposed to face the rotor 20 in the radial direction. The stator 30 includes a stator core 31, an insulator 32, and a plurality of coils 33.

The stator core 31 includes a core back 311 and a plurality of teeth 312. The core back 311 is annular around the central axis C. A plurality of teeth 312 extend radially inward from a radially inner circumferential surface of the core back 311 toward the central axis C. The plurality of teeth 312 are arranged at predetermined intervals in the circumferential direction. The stator core 31 is formed by, for example, layering a plurality of electromagnetic steel plates in the vertical direction.

The insulator 32 is disposed on the stator core 31. The insulator 32 is provided to surround the outer surfaces of the teeth 312. The insulator 32 is disposed between the stator core 31 and the coil 33. The insulator 32 is made of, for example, an insulating member such as a synthetic resin. Note that radially inner circumferential surfaces of the teeth 312, which are portions facing the magnet 23, are exposed from the insulator 32.

The coil 33 is formed of a conductive wire wound around the insulator 32 in each of the plurality of teeth 312. That is, the insulator 32 is interposed between the teeth 312 and the coils 33. The teeth 312 and the coils 33 are electrically insulated from each other by the insulator 32. The plurality of coils 33 are arranged at predetermined intervals in the circumferential direction.

Note that the motor 1 has twelve coils 33 in the present example embodiment. Then, six sets of the coils 33 are formed by continuously winding two coils 33 as one set with one conductive wire. Each of the six sets of the six coils 33 has two lead wires 331 extending upward. That is, the motor 1 has twelve lead wires 331. Note that the lead wire 331 is an end portion of the conductive wire forming the coil 33.

A pair of the bearings 40 is disposed on the upper and lower sides in the axial direction. The bearing 40 on the upper side is disposed above the stator 30. The bearing on the lower side is disposed below the stator 30. The shaft 21 is fixed to the radially inner side of the pair of bearings 40. The pair of bearings 40 supports an upper portion and a lower portion of the shaft 21 so as to be rotatable about the central axis C.

The casing 50 encloses the rotor 20 and the stator 30. The casing 50 includes a bearing holding portion 51 and a motor housing (not illustrated). The bearing holding portion 51 has, for example, a cylindrical shape around the central axis C, and is disposed above the rotor 20 and the stator 30. The bearing holding portion 51 holds the bearing 40 on the upper side. Therefore, the casing 50 supports the rotor 20 with the bearing 40 interposed therebetween. The motor housing is disposed on a radially outer circumferential portion of the stator 30 and supports the stator 30. That is, the casing 50 supports the rotor 20 and the stator 30.

Note that the casing 50 may include a heat sink configured to dissipate heat generated when the motor 1 is used. Furthermore, the bearing holding portion 51 may also be configured to serve as the heat sink.

The lead wire support portion 60 is disposed above the stator 30. The lead wire support portion 60 has an annular shape extending along the circumferential direction of the stator 30 around the central axis C. The lead wire support portion 60 supports a plurality of (twelve) lead wires 331 extending from the plurality of coils 33.

The terminals 70 are attached to the casing 50. Specifically, the terminals 70 are disposed in an outer circumferential portion of the bearing holding portion 51 above the stator 30. The terminal 70 is electrically connected to the six lead wires 331 extending from the coils 33.

In the motor 1 configured as described above, when a drive current is supplied to the coils 33, a magnetic flux in the radial direction is generated in the stator core 31. A magnetic field generated by the magnetic flux of the stator 30 and a magnetic field generated by the magnet 23 act to generate torque in the circumferential direction of the rotor 20. The torque causes the rotor 20 to rotate about the central axis C.

Figure 4:
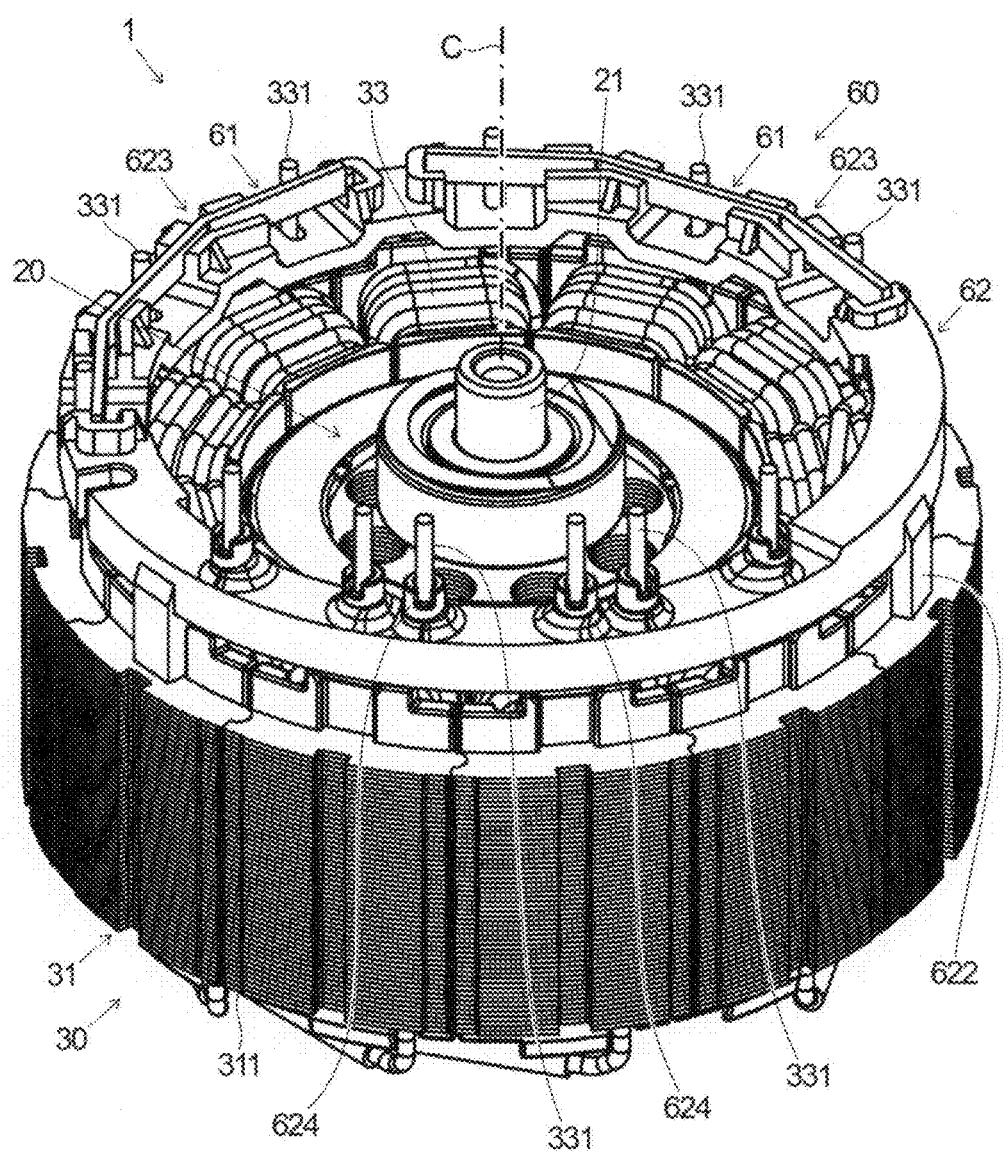
FIG. 4 is a perspective view of the motor from which a casing is removed.

FIG. 4 is a perspective view of the motor 1 from which the casing 50 is removed. The lead wire support portion 60 includes conducting members 61 and an annular portion 62.

The conducting member 61 is a neutral point bus bar in the present example embodiment. Two conducting members 61 are attached to the annular portion 62. The conducting member 61 is a plate-like member extending along the circumferential direction of the stator 30, and is made of a material having high electrical conductivity such as copper. Each of the two conducting members 61 electrically connects a plurality of (three) lead wires 331. The three lead wires 331 are electrically connected in Y connection via the conducting members 61. Note that the lead wires 331 may be electrically connected to each other in a direct manner without using the conducting member 61. That is, the conducting member 61 may be the lead wire 331.

The annular portion 62 is disposed on the upper side of the radially outer circumferential side of the stator core 31 (see FIG. 4). The annular portion 62 extends annularly along the circumferential direction of the stator 30. The conducting member 61 is attached to the annular portion 62.

Figure 5:
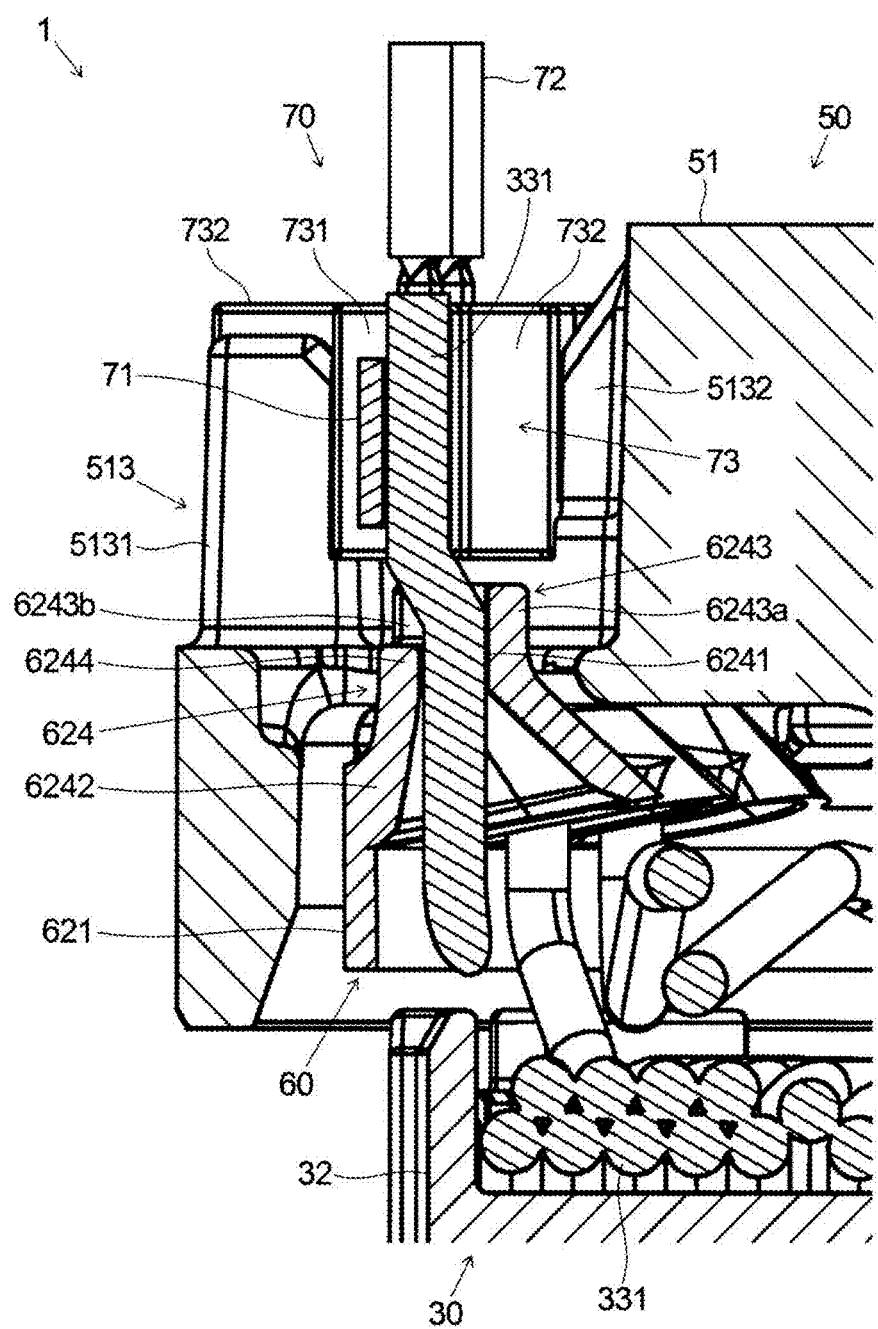
FIG. 5 is a partially enlarged longitudinal sectional view illustrating locations of a lead wire support portion and a terminal of the motor.
Figure 6:
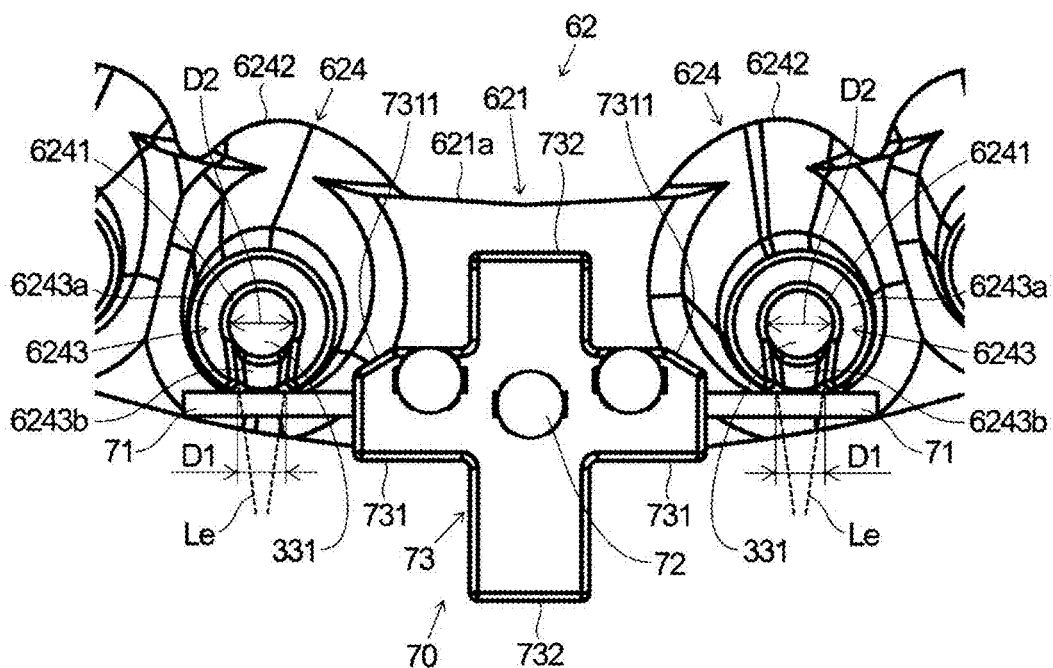
FIG. 6 is a plan view illustrating a positional relationship between the lead wire support portion and the terminal.
Figure 7:
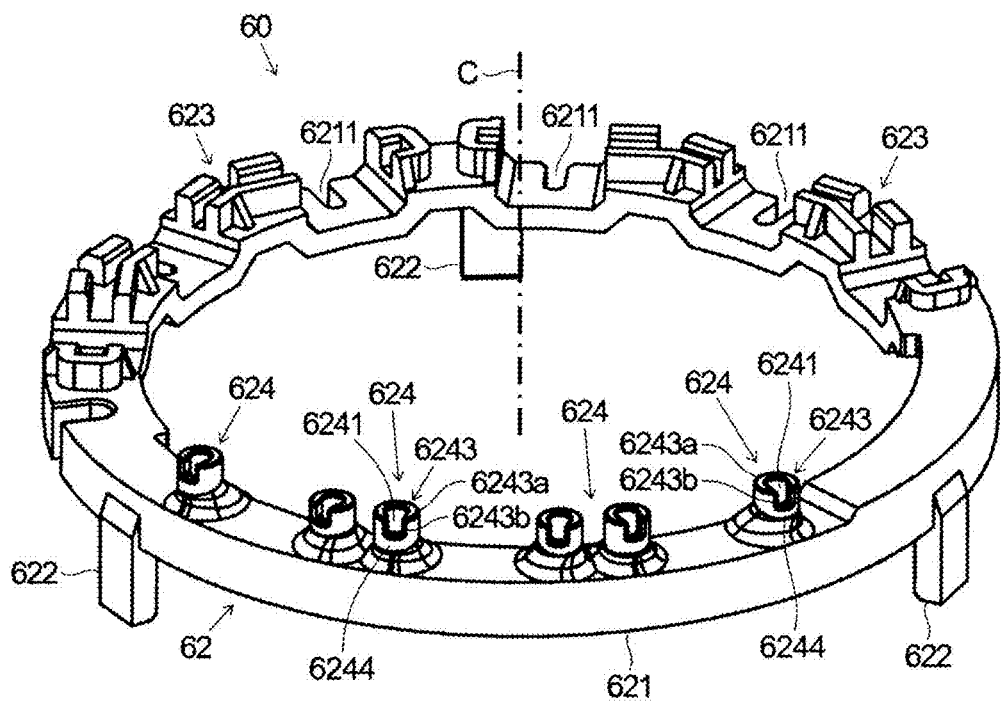
FIG. 7 is a perspective view of the lead wire support portion.

FIG. 5 is a partially enlarged longitudinal sectional view illustrating locations of the lead wire support portion 60 and the terminal 70 of the motor 1. FIG. 6 is a plan view illustrating a positional relationship between the lead wire support portion 60 and the terminal 70. FIG. 7 is a perspective view of the lead wire support portion 60.

The annular portion 62 includes an annular base 621, support columns 622, holding portions 623, and guide portions 624. That is, the lead wire support portion 60 includes the annular base 621 and the guide portions 624.

The annular base 621 is formed in a substantially plate shape extending annularly along the circumferential direction of the stator 30 around the central axis C and expanding in the radial direction. In the present example embodiment, the annular base 621 has six lead grooves 6211. The six lead grooves 6211 are arranged at predetermined intervals in the circumferential direction.

The lead grooves 6211 are disposed on a side of a radially outer circumferential portion of the annular base 621, and are recessed by a predetermined length from a radially outer end portion of the annular base 621 to the radially inner side. The lead grooves 6211 penetrate from an upper surface to a lower surface of the annular base 621 in the vertical direction. An inner interval between the lead grooves 6211 in the circumferential direction is larger than an outer diameter of the lead wire 331. The lead wire 331 is inserted into the lead groove 6211 from, for example, a radially outer end side.

The support columns 622 are disposed on the lower surface of the annular base 621 and have a columnar shape extending downward. In the present example embodiment, three support columns 622 are provided and arranged at predetermined intervals in the circumferential direction. A lower end portion of the support column 622 is in contact with an upper surface of the core back 311. Therefore, the support column 622 supports the annular portion 62 on the upper side of the core back 311.

The holding portions 623 are disposed on the upper surface of the annular base 621. In the present example embodiment, two holding portions 623 are provided and disposed side by side in the circumferential direction. The holding portions 623 extend along the circumferential direction of the annular portion 62. The conducting members 61 are attached to the holding portions 623 along the circumferential direction of the annular portion 62. Therefore, the holding portions 623 hold the conducting members 61. The annular portion 62 can hold up to two conducting members 61.

Each of the two holding portions 623 overlaps the three lead grooves 6211 in the circumferential direction. Therefore, each of the two conducting members 61 is adjacent to the three lead wires 331 (see FIG. 4).

The guide portion 624 is disposed on the upper surface of the annular base 621 and has a tubular shape extending upward. In the present example embodiment, six guide portions 624 are provided and disposed side by side in the circumferential direction. That is, the plurality of (six) guide portions 624 are connected by the annular base 621 having an annular shape. The six guide portions 624 are arranged adjacent to each other in the circumferential direction as a set of two. Three sets of the guide portions 624 are arranged at predetermined intervals in the circumferential direction.

The six lead wires 331 extending from the coils 33 are inserted into the guide portions 624 from below and guided toward the upper side of the guide portion 624. That is, the lead wire 331 passes through the guide portion 624, and the lead wire 331 is guided in the axial direction to the upper side of the lead wire support portion 60.

The guide portion 624 includes a guide hole 6241, an insertion portion 6242, a lead portion 6243, and a cylindrical portion 6244.

The guide hole 6241 penetrates the guide portion 624 in the vertical direction. The lead wire 331 extending from the coil 33 is inserted into the guide hole 6241 from below and guided toward the upper side of the guide portion 624.

The insertion portion 6242 is disposed below the guide portion 624 so as to face the coil 33. The guide hole 6241 is open at a lower end portion of the insertion portion 6242. The insertion portion 6242 has a tubular shape into which the lead wire 331 extending from the coil 33 is inserted. At the lower end portion of the insertion portion 6242, an inner diameter of the guide hole 6241 is larger than an outer diameter of the lead wire 331 such that the lead wire 331 can be easily inserted. An outer shape of the insertion portion 6242 is, for example, a truncated cone shape whose outer diameter increases from the upper side toward the lower side.

The lead portion 6243 is disposed above the insertion portion 6242 and above the guide portion 624. The guide hole 6241 is open at an upper end portion of the lead portion 6243. The lead portion 6243 has a tubular shape from which the lead wire 331 inserted from the insertion portion 6242 is drawn out.

The lead portion 6243 includes a circumferential wall 6243a and a notch 6243b. The circumferential wall 6243a has a cylindrical shape extending in the vertical direction. In the notch 6243b, a part of the circumferential wall 6243a in the circumferential direction is opened in the radial direction. Specifically, the notch 6243b is adjacent to the guide hole 6241. The notch 6243b is opened to be continuous with the guide hole 6241 in the upper end portion of the lead portion 6243. Further, the notch 6243b is opened radially outward with respect to the central axis C.

The cylindrical portion 6244 is disposed to be continuous on the lower side of the lead portion 6243. The cylindrical portion 6244 is disposed between the lead portion 6243 and the insertion portion 6242. Note that the insertion portion 6242 is disposed to be continuous on the lower side of the cylindrical portion 6244 in the present example embodiment. The cylindrical portion 6244 has the same inner diameter as the outer diameter of the lead wire 331.

According to the above configuration, the guide portion 624 that guides the lead wire 331 in the vertical direction includes the tubular insertion portion 6242 and the tubular lead portion 6243. The lead wire 331 is included in the guide portion 624 and can ensure an insulation property. Furthermore, a movable range permitting deforming and displacing the lead wire 331 can be provided in the notch 6243b of the lead portion 6243. That is, the motor 1 can achieve both the insulation property of the lead wire 331 and the workability at the time of connecting the lead wire 331.

Further, when the lead wire 331 is deformed and displaced in the notch 6243b, the lead wire 331 can be held by the cylindrical portion 6244 on the lower side according to the above configuration. Therefore, it is possible to improve workability at the time of connecting the lead wire 331.

Note that, specifically, it is preferable that the inner diameter of the cylindrical portion 6244 be slightly larger than or substantially the same as the outer diameter of the lead wire 331 in order to easily insert the lead wire 331 and to easily hold the lead wire 331.

FIG. 6 illustrates an extension line Le obtained by extending an inner surface of a sidewall, which extends in the vertical direction, of the notch 6243b radially outward. That is, the notch 6243b has a tapered shape in which a circumferential interval of an opening narrows from the radially inner side to the radially outer side of the lead portion 6243. As illustrated in FIG. 6, a circumferential interval D1 of a radially outer edge of the notch 6243b is shorter than an outer diameter D2 of the lead wire 331.

According to the above configuration, it is possible to suppress displacement of the lead wire 331 in a direction other than the radial direction on the notch 6243b. Therefore, the lead wire 331 can be easily guided in the radial direction on the notch 6243b.

As illustrated in FIG. 6, the motor 1 includes lead wire terminal portions 71 to be described in detail later. Two lead wire terminal portions 71 are provided in each of the terminals 70. The two lead wire terminal portions 71 of the terminal 70 electrically connect a plurality of (two) adjacent lead wires 331. As illustrated in FIG. 6, the notch 6243b faces the lead wire terminal portion 71 in a direction intersecting the axial direction as viewed from above. According to this configuration, the lead wire 331 can be easily guided toward the lead wire terminal portion 71.

As illustrated in FIG. 5, an upper end portion of the guide portion 624 is located above a lower end portion of the bearing holding portion 51. According to this configuration, an upper portion of the guide portion 624 overlaps the bearing holding portion 51 in the radial direction. Therefore, it is possible to suppress an increase in size of the motor 1 in the vertical direction.

As illustrated in FIG. 6, the guide portions 624 are connected by the annular base 621. A lower portion of the insertion portion 6242 of the guide portion 624 protrudes radially inward (upward in FIG. 6) from a radially inner end portion 621a of the annular base 621. That is, a radially inner end portion of the insertion portion 6242 is located radially inward of the radially inner end portion 621a of the annular base 621.

According to the above configuration, a material used for the annular portion 62 can be reduced. Further, the insertion portion 6242 can be enlarged as viewed from the vertical direction, and the lead wire 331 can be easily inserted into the guide portion 624.

As illustrated in FIG. 5, the lead wire 331 is bent toward a connection target member near the guide portion 624 when being electrically connected to the connection target member (the lead wire terminal portion 71 to be described later). At this time, the lead wire 331 is guided by the notch 6243b toward the connection target member. Specifically, the lead wire 331 is bent radially outward with respect to the central axis C by the notch 6243b. Therefore, the lead wire 331 overlaps the notch 6243b in the vertical direction above the guide portion 624.

The lead wire 331 can be separated from the connection target member before the electrical connection with the connection target member. Therefore, the lead wire 331 does not become an obstacle when the connection target member is attached to the casing 50, and the attachment can be easily performed.

Figure 8:
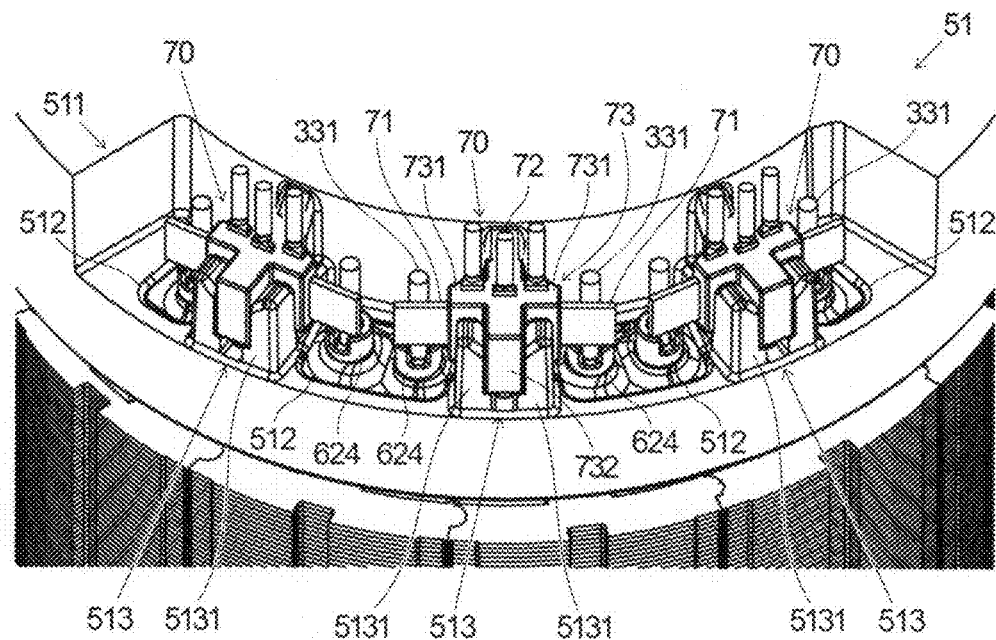
FIG. 8 is a partially enlarged perspective view of the terminal and a mounting portion.
Figure 9:
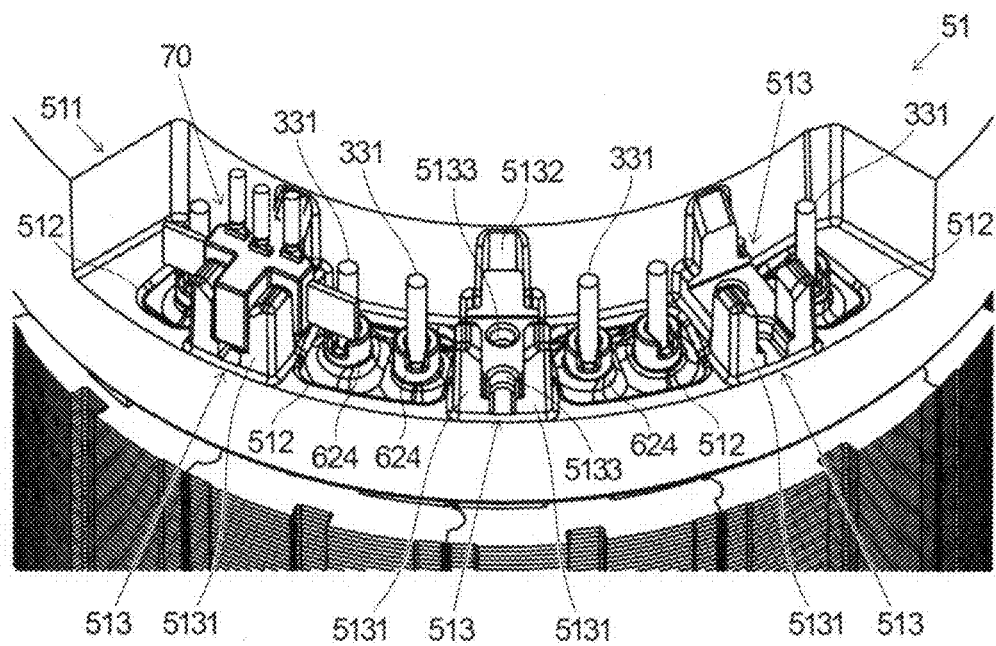
FIG. 9 is a partially enlarged perspective view of the terminal and the mounting portion.

FIGS. 8 and 9 are partially enlarged perspective views of the bearing holding portion 51. FIG. 9 illustrates a state in which two of the three terminals 70 are removed from the bearing holding portion 51. The bearing holding portion 51 includes a stepped portion 511, openings 512, and mounting portions 513.

The stepped portion 511 is disposed on a radially outer circumferential portion of an upper portion of the bearing holding portion 51 and has an arc shape extending in the circumferential direction by a predetermined length. The stepped portion 511 is recessed downward from an upper surface of the bearing holding portion 51 by a predetermined height, and is recessed radially inward from a radially outer end portion of the bearing holding portion 51 by a predetermined length.

The openings 512 are disposed at an inner bottom of the stepped portion 511. The opening 512 penetrates the bearing holding portion 51 in the vertical direction. In the present example embodiment, the bearing holding portion 51 has four openings 512. The four openings 512 are arranged in the circumferential direction. The opening 512 has a substantially rectangular shape as viewed from above.

The guide portion 624 is inserted into the opening 512 from the lower side to the upper side. One guide portion 624 is inserted into each of the two openings 512 at both circumferential end portions among the four openings 512. Two guide portions 624 are inserted into each of two openings 512 closer to the circumferential central portion among the four openings 512. That is, the two openings 512 closer to the circumferential central portion among the four openings 512 are larger in size than the two openings 512 at the both circumferential end portions.

The mounting portions 513 are disposed among the four openings 512 in the circumferential direction. That is, the bearing holding portion 51 has three mounting portions 513 in the present example embodiment.

Each of the three mounting portions 513 is provided for three sets of the guide portions 624 arranged in the circumferential direction with two guide portions 624 as one set, and is disposed between the two guide portions 624 of each set as viewed from above. The terminal 70 is attached to each of the three mounting portions 513.

Figure 10:
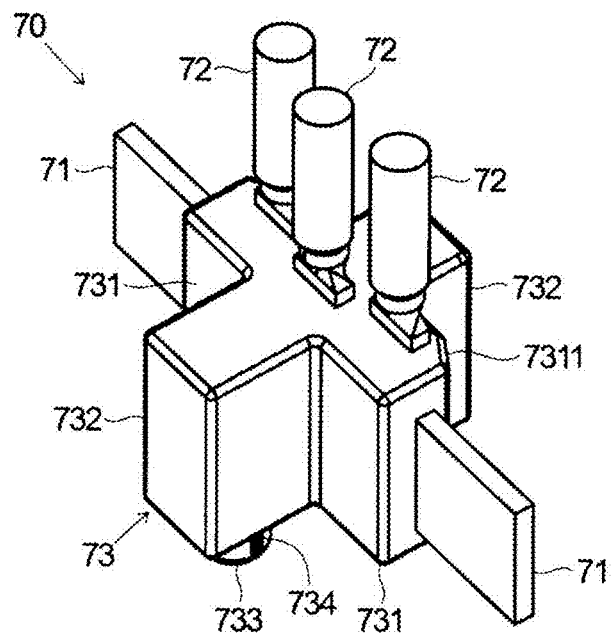
FIG. 10 is a perspective view of the terminal as viewed from above.
Figure 11:
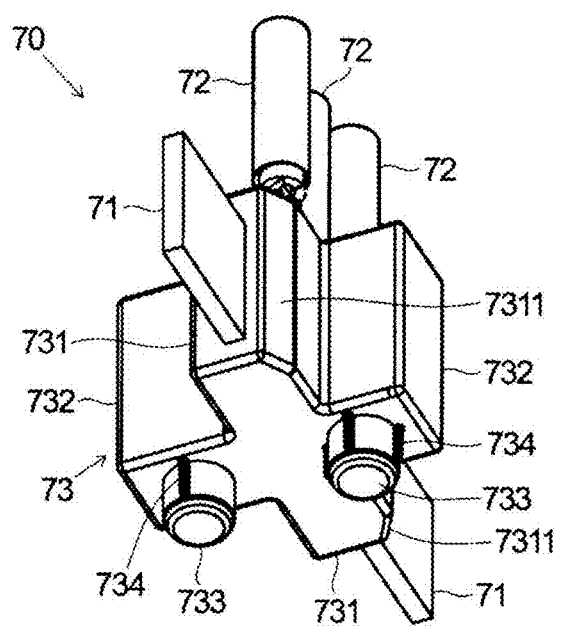
FIG. 11 is a perspective view of the terminal as viewed from below.

FIG. 10 is a perspective view of the terminal 70 as viewed from above. FIG. 11 is a perspective view of the terminal 70 as viewed from below. The terminal 70 includes lead wire terminal portions 71, external terminal portions 72, and a holding member 73.

The lead wire terminal portions 71 are disposed respectively on two side surfaces of the holding member 73 facing two directions intersecting the axial direction. The terminal 70 has the two lead wire terminal portions 71 extending in opposite directions. The lead wire terminal portion 71 extends outward of the terminal 70 in the direction intersecting the axial direction.

The lead wire terminal portion 71 has a plate shape extending in its extending direction and the axial direction, and is made of a material having high electrical conductivity such as copper. As illustrated in FIGS. 8 and 9, each of the two lead wire terminal portions 71 is electrically connected to the lead wire 331 drawn out from the guide portion 624 inserted into the opening 512. That is, the terminal 70 includes the lead wire terminal portion 71 extending in the direction intersecting the axial direction toward the lead wire 331.

Note that, for example, the lead wire terminal portion 71 may have a form in which a distal end portion is curved to wind and hold the lead wire 331. Further, for example, the lead wire terminal portion 71 may have a form in which a distal end portion is divided into a plurality of portions to sandwich the lead wire 331.

The external terminal portion 72 is disposed on an upper surface of the holding member 73. The external terminal portion 72 extends axially upward toward the outside of the casing 50. In the present example embodiment, the terminal 70 has three external terminal portions 72. The number of the external terminal portions 72 may be changed on the basis of a value of a flowing current or the like. The external terminal portion 72 is electrically connected to the lead wire terminal portion 71 inside the terminal 70.

The external terminal portion 72 has a columnar shape extending in its extending direction thereof, and is made of a material having high electrical conductivity such as copper, for example. The external terminal portion 72 may be configured using, for example, a press-fit terminal. The external terminal portion 72 is electrically connected to a control board or the like outside the motor 1.

According to the above configuration, the terminal 70 is provided between the lead wire 331 of the coil 33 and the outside of the motor 1. The terminal 70 can adjust a connection position of the motor 1 with the outside with respect to the position of the lead wire 331 of the coil 33. Therefore, the motor 1 can be easily positioned with respect to the external control board or the like.

Note that positions of the three external terminal portions 72 are different in the radial direction as illustrated in FIG. 6. Specifically, among the three external terminal portions 72 arranged in the circumferential direction, one external terminal portion 72 at the center is located radially outward of the other two external terminal portions 72 on both sides thereof. According to this configuration, a circumferential length of the terminal 70 can be shortened. Therefore, a space for a region in which the terminal 70 is disposed can be saved.

The holding member 73 holds the lead wire terminal portion 71 and the external terminal portion 72. Each of the lead wire terminal portion 71 and the external terminal portion 72 extends outward from the holding member 73. The holding member 73 has first arms 731 and second arms 732.

The first arm 731 extends outward of the terminal 70 in the direction intersecting the axial direction. In the present example embodiment, the terminal 70 has two first arms 731 extending in directions opposite to each other. The two first arms 731 have a rectangular parallelepiped shape. Each of the two first arms 731 extends along the extending direction of each of the two lead wire terminal portions 71. The lead wire terminal portion 71 is exposed from a distal end portion of the first arm 731.

Note that at least one first arm 731 may be provided as will be described later as a modification. For example, in a case where the lead wire 331 exists only on any one of both the circumferential sides of the terminal 70, the single first arm 731 may be provided.

The second arm 732 extends in the radial direction to intersect the extending direction of the first arm 731. In the present example embodiment, the second arm 732 extends in the radial direction. The terminal 70 has two second arms 732 extending in directions opposite to each other. The two second arms 732 have a rectangular parallelepiped shape.

Note that at least one second arm 732 may be provided as will be described later as a modification.

According to the above configuration, the terminal 70 has the first arms 731 and the second arms 732 extending in the directions intersecting each other, and thus, can be easily positioned with respect to the mounting portion 513.

The first arm 731 has an inclined portion 7311. The inclined portion 7311 is disposed to face the lead wire 331 (see FIG. 6). In the inclined portion 7311, a radially inner circumferential outer end portion of the first arm 731 is inclined in a direction away from the lead wire 331.

In the present example embodiment, the inclined portion 7311 has an inclined surface shape that extends in a direction intersecting each of the extending direction of the first arm 731 and the extending direction of the second arm and faces the lead wire 331. Note that the inclined portion 7311 may have, for example, a curved surface shape centered on an axis of the lead wire 331.

According to the above configuration, the terminal 70 can be disposed so as not to be too close to the lead wire 331. Therefore, it is possible to improve the workability at the time of connecting the lead wire 331 and the lead wire terminal portion 71.

The holding member 73 further has protrusions 733. The protrusion 733 is disposed on a lower surface of the holding member 73. The protrusion 733 has a columnar shape extending downward from the holding member 73. In the present example embodiment, the holding member 73 has two protrusions 733. The two protrusions 733 are arranged at a predetermined interval in the radial direction.

Note that, specifically, the holding member 73 further has ribs 734. The rib 734 is disposed on an outer circumferential portion of the columnar protrusion 733. The rib 734 protrudes outward from the outer circumferential portion of the protrusion 733 and extends in the vertical direction. In the present example embodiment, the holding member 73 has four ribs 734 on each of the two protrusions 733. The four ribs 734 disposed on the outer circumferential portion of one protrusion 733 are arranged at predetermined intervals in the circumferential direction of the outer circumference of the protrusion 733.

As illustrated in FIGS. 8 and 9, the mounting portion 513 includes first support portions 5131, a second support portion 5132, and recesses 5133.

The first support portion 5131 extends axially upward from the upper surface of the bearing holding portion 51. The mounting portion 513 has two first support portions 5131. The two first support portions 5131 are disposed to face each other in the direction intersecting the axial direction with the second arms 732 of the terminal 70 attached to the mounting portion 513 interposed therebetween. The two first support portions 5131 have a rectangular parallelepiped shape.

The second support portion 5132 extends axially upward from the upper surface of the bearing holding portion 51. The mounting portion 513 has one second support portion 5132. The second support portion 5132 is disposed to face the two first support portions 5131 in the radial direction with the first arms 731 of the terminal 70 attached to the mounting portion 513 interposed thereamong. The second support portion 5132 has a rectangular parallelepiped shape.

According to the above configuration, the terminal 70 can be fixed to the bearing holding portion 51 with the terminal 70 sandwiched among the two first support portions 5131 and the one second support portion 5132.

The recess 5133 is disposed at the bottom of the mounting portion 513. The recess 5133 is recessed downward from the bearing holding portion 51. In the present example embodiment, the mounting portion 513 has two recesses 5133. The two recesses 5133 are arranged at a predetermined interval in the radial direction.

When the terminal 70 is attached to the mounting portion 513, the protrusions 733 (see FIG. 11) are inserted into the recesses 5133. Further, when the terminal 70 is attached to the mounting portion 513, the protrusions 733 are press-fitted into the recesses 5133 so as to crush the ribs 734.

Note that the recess may be provided in the holding member 73, and the protrusion may be provided in the mounting portion 513. That is, the motor 1 includes a protrusion which is disposed on one of the mounting portion 513 and the holding member 73 and protrudes toward the other, and a recess which is disposed on the other of the mounting portion 513 and the holding member 73 and into which the protrusion is inserted.

According to the above configuration, the terminal 70 can be easily positioned in the vertical direction (axial direction).

Next, modifications of the terminal 70 and the mounting portion 513 will be described. Note that the basic configuration of the modifications is the same as that of the above example embodiment described with reference to FIGS. 1 to 11, the same reference signs or the same names may be assigned to common components, and the description thereof may be omitted. Further, components excluding characteristic parts are not illustrated in the drawings.

Figure 12:
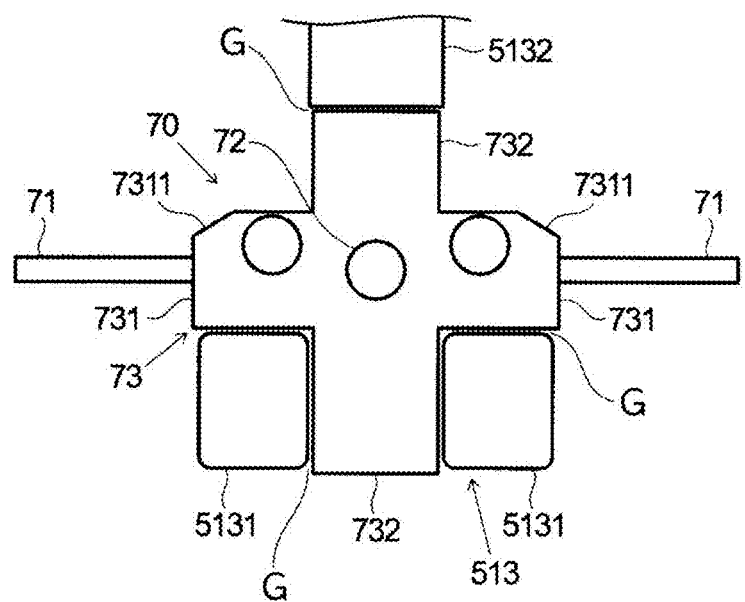
FIG. 12 is a plan view of a terminal and a mounting portion of a first modification of an example embodiment of the present disclosure.

FIG. 12 is a plan view of a terminal 70 and a mounting portion 513 of a first modification. A motor 1 of the first modification includes the terminal 70 and the mounting portion 513.

First support portions 5131 faces first arms 731 and second arms 732 with gaps G interposed therebetween, respectively. Specifically, the first support portion 5131 faces the first arm 731 in the radial direction with the gap G interposed therebetween. Further, the first support portion 5131 faces the second arm 732 in the circumferential direction with the gap G interposed therebetween. A second support portion 5132 faces the second arm 732 with a gap G interposed therebetween. Specifically, the second support portion 5132 faces the second arm 732 in the radial direction with the gap G interposed therebetween.

According to the above configuration, the terminal 70 attached to the mounting portion 513 can be slightly displaced. Therefore, it is possible to alleviate stress that is likely to be generated at the time of connecting a lead wire terminal portion 71 and a lead wire 331 or at the time of connecting an external terminal portion 72 and the outside.

Figure 13:
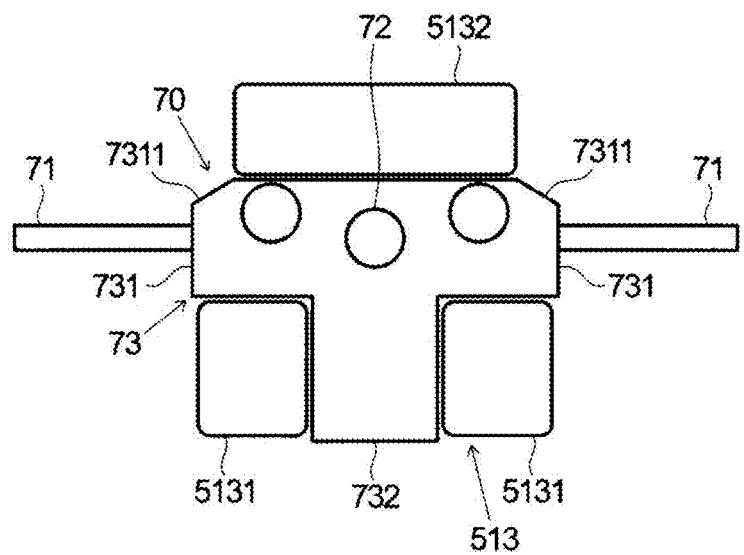
FIG. 13 is a plan view of a terminal and a mounting portion of a second modification of an example embodiment of the present disclosure.

FIG. 13 is a plan view of a terminal 70 and a mounting portion 513 of a second modification. A motor 1 of the second modification includes the terminal 70 and the mounting portion 513.

The terminal 70 has two first arms 731 extending toward both sides (both left and right sides in FIG. 13) in a direction intersecting an axial direction (depth direction of the sheet plane of FIG. 13). Further, the terminal 70 has one second arm 732 extending radially outward (downward in FIG. 13).

The mounting portion 513 has one second support portion 5132 adjacent to the radially inner side (the upper side in FIG. 13) of the two first arms 731.

According to the above configuration, the terminal 70 can be fixed to the bearing holding portion 51 with the terminal 70 sandwiched among the two first support portions 5131 and the one second support portion 5132.

Figure 14:
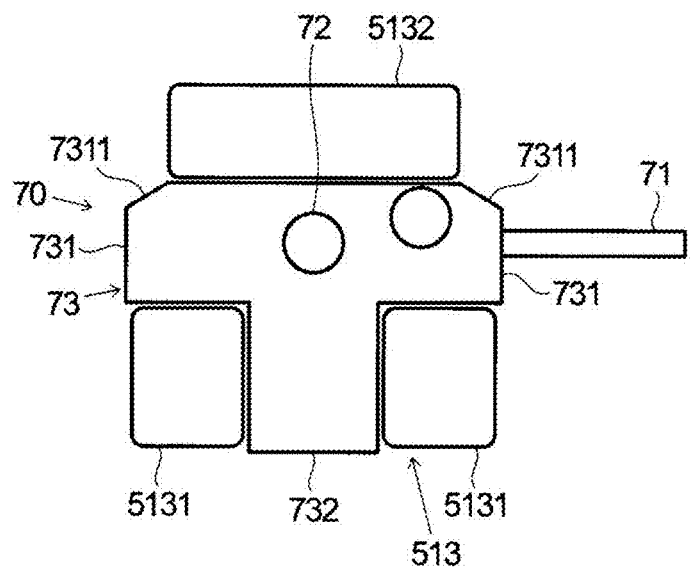
FIG. 14 is a plan view of a terminal and a mounting portion of a third modification of an example embodiment of the present disclosure.

FIG. 14 is a plan view of a terminal 70 and a mounting portion 513 of a third modification. A motor 1 of the third modification includes the terminal 70 and the mounting portion 513.

The terminal 70 has two first arms 731 extending toward both sides (both left and right sides in FIG. 14) in a direction intersecting an axial direction (depth direction of the sheet plane of FIG. 14). A lead wire terminal portion 71 is disposed with respect to only one first arm 731 out of the two first arms 731. That is, the terminal 70 includes the two first arms 731 and the one lead wire terminal portion 71. Further, the terminal 70 includes two external terminal portions 72 in the present modification.

According to the above configuration, the terminal 70 can be fixed to the bearing holding portion 51 with the terminal 70 sandwiched among the two first support portions 5131 and the one second support portion 5132.

Figure 15:
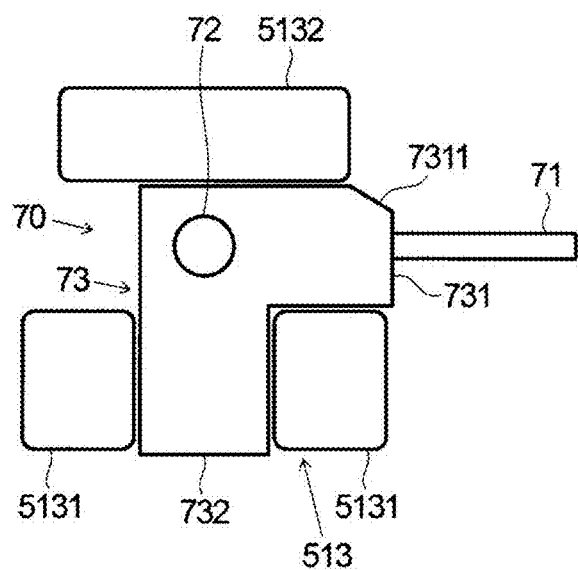
FIG. 15 is a plan view of a terminal and a mounting portion of a fourth modification of an example embodiment of the present disclosure.

FIG. 15 is a plan view of a terminal 70 and a mounting portion 513 of a fourth modification. A motor 1 of the fourth modification includes the terminal 70 and the mounting portion 513.

The terminal 70 has one first arm 731 extending toward one side (the right side in FIG. 15) in a direction intersecting an axial direction (depth direction of the sheet plane of FIG. 15). Note that the one first arm 731 may be provided on the opposite side (the left side in FIG. 15) of a holding member 73. A lead wire terminal portion 71 is disposed with respect to the one first arm 731. That is, the terminal 70 includes the one first arm 731 and the one lead wire terminal portion 71. Further, the terminal 70 includes one external terminal portion 72 in the present modification.

According to the above configuration, the terminal 70 can be fixed to the bearing holding portion 51 with the terminal 70 sandwiched among the two first support portions 5131 and the one second support portion 5132.

Figure 16:
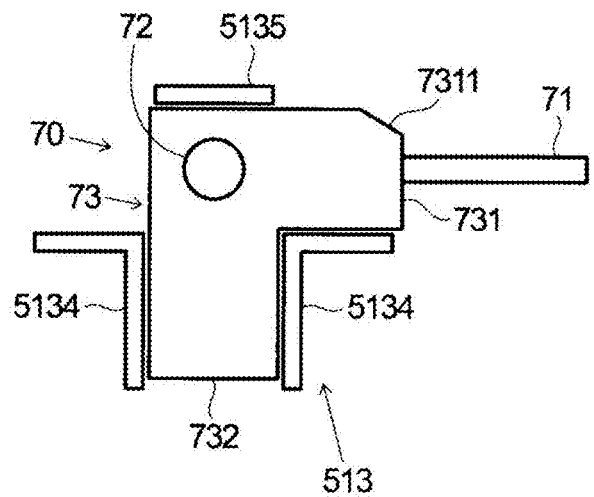
FIG. 16 is a plan view of a terminal and a mounting portion of a fifth modification of an example embodiment of the present disclosure.

FIG. 16 is a plan view of a terminal 70 and a mounting portion 513 of a fifth modification. A motor 1 of the fifth modification includes the terminal 70 and the mounting portion 513.

The mounting portion 513 has two first support portions 5134 disposed to face each other in a direction (left-right direction in FIG. 16) intersecting an axial direction (depth direction of the sheet plane of FIG. 16) with a second arm 732 interposed therebetween. The two first support portions 5134 each a plate shape extending in the axial direction.

The mounting portion 513 has one second support portion 5135 adjacent to the radially inner side (the upper side in FIG. 16) of two first arms 731. The one second support portion 5135 has a plate shape extending in the axial direction.

According to the above configuration, the terminal 70 can be fixed to a bearing holding portion 51 in a form of sandwiching the terminal 70 among the two plate-shaped first support portions 5134 and the one plate-shaped second support portion 5135.

Figure 17:
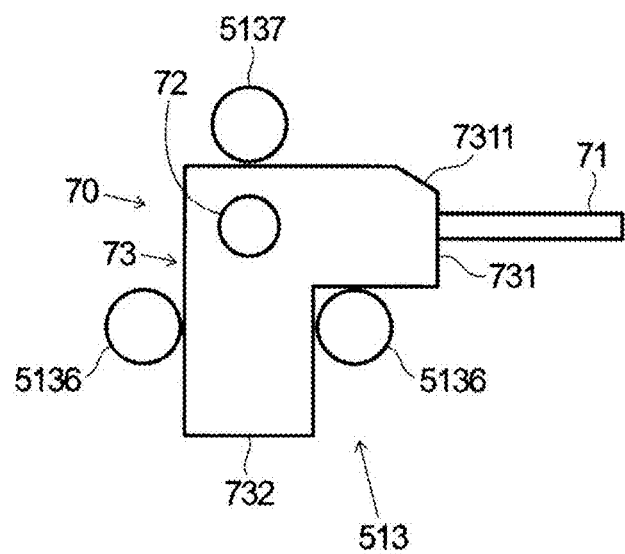
FIG. 17 is a plan view of a terminal and a mounting portion of a sixth modification of an example embodiment of the present disclosure.

FIG. 17 is a plan view of a terminal 70 and a mounting portion 513 of a sixth modification. A motor 1 of the sixth modification includes the terminal 70 and the mounting portion 513.

The mounting portion 513 has two first support portions 5136 disposed to face each other in a direction (left-right direction in FIG. 17) intersecting an axial direction (depth direction of the sheet plane of FIG. 17) with a second arm 732 interposed therebetween. The two first support portions 5136 have a columnar shape extending in the axial direction.

The mounting portion 513 has one second support portion 5137 adjacent to the radially inner side (the upper side in FIG. 16) of two first arms 731. The one second support portion 5137 has a columnar shape extending in the axial direction.

According to the above configuration, the terminal 70 can be fixed to a bearing holding portion 51 in a form of sandwiching the terminal 70 among the two columnar first support portions 5136 and the one columnar second support portion 5137.

Figure 18:
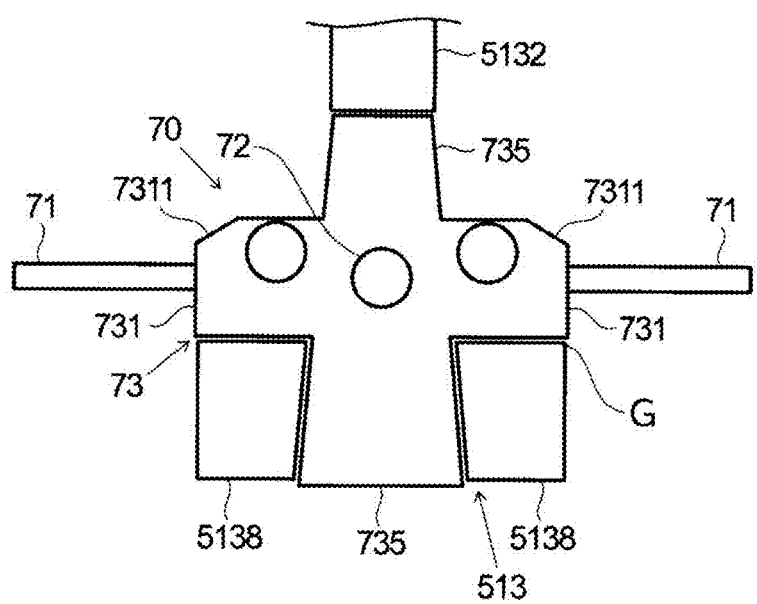
FIG. 18 is a plan view of a terminal and a mounting portion of a seventh modification of an example embodiment of the present disclosure.

FIG. 18 is a plan view of a terminal 70 and a mounting portion 513 of a seventh modification. A motor 1 of the seventh modification includes the terminal 70 and the mounting portion 513.

The terminal 70 has two second arms 735 respectively extending radially inward and outward (upward and downward in FIG. 18). The two second arms 735 have a truncated pyramid shape as viewed from above, and a length in a direction (left-right direction in FIG. 18) intersecting an axial direction (depth direction of the sheet plane of FIG. 18) increases as proceeding radially outward.

The mounting portion 513 has two first support portions 5138 disposed to face each other in a direction intersecting the axial direction with the second arm 735 interposed therebetween. The two first support portions 5138 have a truncated pyramid shape as viewed from above.

According to the above configuration, the terminal 70 can be fixed to a bearing holding portion 51 in a form of sandwiching the terminal 70 among the two first support portions 5138 and one second support portion 5132.

Although the example embodiment of the present disclosure has been described above, the scope of the present disclosure is not limited thereto. The present disclosure can be carried out with addition, omission, substitution, and various other modifications without departing from the gist of the present disclosure.

The present disclosure can be used in the motor. Features of the above-described preferred embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A motor comprising:
   a rotor that includes a shaft located along a central axis extending in a vertical direction;
   a stator that includes coils and opposes the rotor in a radial direction; and
   a lead wire support portion that is above the coil and supports lead wires extending from the coils; wherein
   the lead wire support portion includes a guide portion through which the lead wires extend and which guides the lead wires to an upper side of the lead wire support portion in an axial direction;
   the guide portion includes:
      a tubular insertion portion which opposes the coils and into which the lead wires are inserted; and
      a tubular lead portion which is above the insertion portion and from which
   the lead wires inserted from the insertion portion are drawn out; and
   the lead portion includes a circumferential wall having a cylindrical shape and extending in the vertical direction, and includes a notch in which a portion of the circumferential wall in a circumferential direction is opened in the radial direction.

2. The motor according to claim 1, wherein
   the guide portion includes a cylindrical portion between the lead portion and the insertion portion to be continuous on a lower side of the lead portion; and
   the cylindrical portion has an inner diameter equal to an outer diameter of the lead wires.

3. The motor according to claim 2, further comprising:
   a lead wire terminal portion that electrically connects the plurality of lead wires; wherein
   the notch opposes the lead wire terminal portion in a direction intersecting the axial direction as viewed from above.

4. The motor according to claim 2, further comprising:
   a pair of bearings that supports an upper portion and a lower portion of the shaft to be rotatable about the central axis; and
   a bearing holding portion that holds the bearing on an upper side; wherein
   an upper end portion of the guide portion is located above a lower end portion of the bearing holding portion.

5. The motor according to claim 2, wherein
   the lead wire support portion includes an annular base that annularly extends along a circumferential direction of the stator and connects guide portions; and
   a radially inner end portion of the insertion portion is located radially inward of a radially inner end portion of the annular base.

6. The motor according to claim 2, wherein the lead wires overlaps the notch in the vertical direction above the guide portion.

7. The motor according to claim 1, wherein
   the notch has a tapered shape in which an interval of an opening in the circumferential direction narrows from a radially inner side to a radially outer side of the lead portion; and
   the interval of a radially outer edge of the notch is shorter than an outer diameter of the lead wire.

8. The motor according to claim 7, further comprising:
   a lead wire terminal portion that electrically connects the plurality of lead wires; wherein
   the notch opposes the lead wire terminal portion in a direction intersecting the axial direction as viewed from above.

9. The motor according to claim 7, further comprising:
   a pair of bearings that supports an upper portion and a lower portion of the shaft to be rotatable about the central axis; and
   a bearing holding portion that holds the bearing on an upper side; wherein
   an upper end portion of the guide portion is located above a lower end portion of the bearing holding portion.

10. The motor according to claim 7, wherein
    the lead wire support portion includes an annular base that annularly extends along a circumferential direction of the stator and connects guide portions; and
    a radially inner end portion of the insertion portion is located radially inward of a radially inner end portion of the annular base.

11. The motor according to claim 1, wherein
    the notch has a tapered shape in which an interval of an opening in the circumferential direction narrows from a radially inner side to a radially outer side of the lead portion; and
    the interval of a radially outer edge of the notch is shorter than an outer diameter of the lead wire.

12. The motor according to claim 11, further comprising:
    a pair of bearings that supports an upper portion and a lower portion of the shaft to be rotatable about the central axis; and
    a bearing holding portion that holds the bearing on an upper side; wherein
    an upper end portion of the guide portion is located above a lower end portion of the bearing holding portion.

13. The motor according to claim 11, wherein
    the lead wire support portion includes an annular base that annularly extends along a circumferential direction of the stator and connects guide portions; and
    a radially inner end portion of the insertion portion is located radially inward of a radially inner end portion of the annular base.

14. The motor according to claim 1, further comprising:
    a lead wire terminal portion that electrically connects the plurality of lead wires; wherein the notch opposes the lead wire terminal portion in a direction intersecting the axial direction as viewed from above.

15. The motor according to claim 14, wherein
the lead wire support portion includes an annular base that annularly extends along a circumferential direction of the stator and connects guide portions; and
a radially inner end portion of the insertion portion is located radially inward of a radially inner end portion of the annular base.

16. The motor according to claim 1, further comprising:
a pair of bearings that supports an upper portion and a lower portion of the shaft to be rotatable about the central axis; and
a bearing holding portion that holds the bearing on an upper side; wherein
an upper end portion of the guide portion is located above a lower end portion of the bearing holding portion.

17. The motor according to claim 1, wherein
the lead wire support portion includes an annular base that annularly extends along a circumferential direction of the stator and connects guide portions; and
a radially inner end portion of the insertion portion is located radially inward of a radially inner end portion of the annular base.

18. The motor according to claim 1, wherein the lead wires overlaps the notch in the vertical direction above the guide portion.

* * * * *